3,008,817
GROWTH PROMOTING COMPOSITION AND METHODS

Louis G. Nickell, Port Washington, N.Y., assignor to Chas. Pfizer & Co., Inc., New York, N.Y., a corporation of Delaware
No Drawing. Filed Jan. 29, 1958, Ser. No. 711,808
8 Claims. (Cl. 71—2.5)

This application is concerned with new and useful agricultural compositions. In particular, it is concerned with new and useful agricultural compositions containing a 5-hydroxy-4-pyrone-2-methylisothiouronium halide.

It has been unexpectedly found that a 5-hydroxy-4-pyrone-2-methylisothiouronium halide has a growth promoting effect when applied to plants of various species. The chemical agent of this invention is particularly effective in promoting growth of foliage and plant roots. When using plant growth promoters of the prior art, one outstanding disadvantage is chlorosis of the plant foliage, which is, in most cases, a deficiency of pigment, in other cases, a symptom of toxicity. However, with the compounds of the present invention, no noticeable diminution of pigmentation occurs. Other advantages of the present compound are made obvious by the following disclosure.

The process of the present invention is carried out by contacting a plant with a 5-hydroxy-4-pyrone-2-methylisothiouronium halide, for example, the chloride, bromide or iodide. The plant may be contacted with the active agent by any of the various means common to agricultural practices which include spraying, dusting, soil infusion or injection.

The active agent of this invention can be used alone but it is so effective and has such activity that it will be greatly desirable to use it in the form of a composition containing at least 0.0001% of 5-hydroxy-4-pyrone-2-methylisothiouronium halide dispersed in a suitable extending agent.

In this disclosure, the term, "dispersed" is used in the widest possible sense. It includes particles of molecular size held in true solution in a suitable solvent. It includes particles of colloidal size dispersed in a liquid phase in the form of suspensions or emulsions or in the form of particles which are dispersed in a semi-solid viscous carrier such as a petroleum jelly (e.g. that sold under the trademark Vaseline) or soap in which case the particles may be actually dissolved in the carrier or held in suspension in the carrier with the aid of suitable emulsifying or wetting agents. The "dispersing" also includes particles which may be mixed with and spread throughout a solid carrier so that the composition is in the form of a powder or dust. "Dispersed" also includes compositions suitable for use as aerosols such as a solution, suspension or emulsion in a carrier of the Freon type, for example, Freon-11 (trichloromonofluoromethane), Freon-12 (dichlorodifluoromethane), Freon-22 (monochloro-difluoromethane), Freon-113 (trichlorotrifluoroethane) or Freon-114 (dichlorotetrafluoroethane).

The term "extending agents" as used in this disclosure includes any and all of the usual economically practical, commercially available extending agents conveniently used in the agricultural field. It includes, therefore, the solvents of a true solution, the liquid phase of suspensions, emulsions or aerosols, the semi-solid carrier of ointments and the solid phase of dust and powders. These agents should, of course, be non-toxic to the plants at the levels employed and chemically inert towards 5-hydroxy-4-pyrone-2-methylisothiouronium halide.

It has been found that a 5-hydroxy-4-pyrone-2-methylisothiouronium halide is effective when dispersed in an extending agent at a concentration as little as 0.0001% by weight. This concentration is effective when the dispersing agent is liquid, but it is preferred although not necessary to use more concentrated mixtures, for example, up to 0.04% by weight, when the dispersing agent is semi-solid or solid. This is because liquid dispersions which are, of course, suitable for use as sprays or injectable solutions give more intimate contact of the active material with the plant and, therefore, are more effective at lower concentrations. There are a number of liquid media which may be utilized for the preparation of solutions, suspensions or emulsions of compositions containing 5-hydroxy-4-pyrone-2-methylisothiouronium halide. It has been found that high boiling oils of vegetable origin such as castor oil or olive oil are suitable. Low boiling, more volatile solvents such as acetone, cyclohexane, carbon tetrachloride, ethylene dichloride, tetrachloroethane, hydrogenated naphthalenes and the like are also useful. Purified, solvent extracted petroleum fractions are especially useful. For certain applications it may be advantageous to resort to mixtures of solvents. If the active agent is to be applied in an aerosol, it is convenient to dissolve it in a suitable solvent and to disperse the resulting solutions in a liquid such as Freon. For such applications it has been found that it is better to employ true solutions of the active agents although it is possible to employ suspensions or emulsions.

The active agents of this invention will often be dispersed either in the form of emulsions or suspensions in an inert carrier such as water with the aid of a capillary-active substance. Such capillary-active substance may be anion-active, cation-active or non-ionizing. There may be mentioned by way of example natural or synthetic soaps, Turkey-red oil, fatty alcohols, sulfonates, esters of fatty acids and the like. Other examples include high molecular weight ammonium compounds as well as condensation products of ethylene and propylene oxide with monohydric and polyhydric alcohols. For use as a powder or dust the 5-hydroxy-4-pyrone-2-methylisothiouronium halide compositions can be prepared using any of a number of extending agents either organic or inorganic in nature which are suitable for the manufacture of pulverulent preparations. These include, for example, calcium carbonate, kaolin, bole, kieselguhr, talcum, casein, magnesium carbonate, boric acid and others. Materials of vegetable origin such as powdered cork, powdered wood and powdered walnut shells are also useful. These compositions may be used in the dry form, or, by the addition of wetting agents, the dried powder can be rendered wettable by water so as to obtain stable aqueous dispersions suitable for use as sprays.

For special purposes it is advantageous to prepare growth promoting compositions in the form of a paste or an ointment by the use of a semi-solid extending agent such as soap, lanolin, or petroleum jelly with or without the aid of solubility promoters and/or dispersing agents.

In all of the forms described above the dispersions may be provided ready for use or they may be provided in a concentrated form suitable for mixing with other extending agents at the time of application.

It is sometimes advantageous to have other active agents, for example, bactericides and/or insecticides such as pyrethrum, streptomycin, oxytetracycline and dichlorodiphenyltrichlorethane, trichlorodiphenyltrichlorethane, Malathion or Chlordan in the same composition which contains a 5-hydroxy-4-pyrone-2-methylisothiouronium halide. A composition of this nature has the advantage that two or more active agents can be distributed in one and the same application.

A particularly useful combination contains the compounds of the present invention with gibberellin. Gibberellin is a known plant growth promoter which is widely useful in agricultural applications. Gibberellin has an outstanding effect in increasing the height of a plant. However, certain disadvantages are noted in the use of gibberellin. Although appreciable elongation of the treated plant does occur, usually, no corresponding increase in the foliage and roots of the plant is noted. Further there is a diminution of pigmentation in the plant foliage. This often results in a skimpy elongated plant with leaves smaller in size and lacking in pigmentaion.

The compositions which contain both gibberellin and a 5-hydroxy-4-pyrone-2-methylisothiouronium halide are found to produce elongation of a plant with concomitant leaf and root growth. In addition, no chlorosis of the foliage is noted. The increased foliage growth is, in fact, even greater than that imparted by a 5-hydroxy-4-pyrone-2-methylisothiouronium halide alone. The combinations of gibberellin and the present compound are particularly advantageous in that they impart the desirable effect of gibberellin alone, namely, increased plant height, and in addition, increased foliage, i.e. leaf size, as well as foliage pigmentation. Further, such combinations reduce the requirements of gibberellin since smaller amounts of gibberellin may be employed to obtain increased plant height.

In general, very minute amounts of the present compounds whether employed alone or in combination with gibberellin are effective in bringing about the stimulation of plant growth as described above. This varies to a certain extent with the manner of application and with the condition of the plant at the time when the material is applied, with the other materials applied to the soil during plant growth and with such conditions as the amount of rainfall, the type of soil, and so forth. However, with the use of small test runs, it is possible to find optimum conditions for a given type of plant, soil, moisture, and so forth. The agents of the present invention may be applied to plant life in a variety of forms in order to stimulate growth. The agents may be applied as such or mixed with various inert or active materials before application. For instance the agent may be mixed with inert materials such as peat moss, fuller's earth of various types, clays and various waste plant materials such as sawdust, and applied to the soil about the roots of the subject plant. Alternatively solutions of the active agent may be prepared for foliar sprays. Aqueous solutions are particularly suitable for systemic absorption of the active agents through the roots and the leaves of the subject plant. The materials used in the present invention are of particular value at the earlier stages of growth of various types of plant life, for example seeds, seedlings and young plants.

With combinations of gibberellin and a 5-hydroxy-4-pyrone-2-methylisothiouronium halide best results are obtained with a ratio by weight of the present compounds to gibberellin being from about 20 to about 40 parts to one. Other ratios of these compounds may be employed and favorable results obtained. A particularly effective method of application of this composition is by means of foliar spray in aqueous solution containing a surface active agent, for example, Tweens (Atlas Powder Corp.). In general, when such aqueous solutions of the present agents are applied in keeping with the process of the present invention, the use of a solution having a fairly low concentration of a 5-hydroxy-4-pyrone-2-methylisothiouronium halide, whether alone or in combination with gibberellin (for example, from about 1 to about 50 p.p.m.) is found particularly effective. The use of larger amounts of the above described agent may result in a decrease in the desired growth effects previously mentioned. Alternatively, there may be employed any of the methods of contacting the plant with the growth promoting agents as described above. Higher concentration of the active materials in dry form as described above may be used. The present active agent may be present either alone, or in combination with gibberellin to the extent of from 0.02% to about 0.04%. The total amount applied per plant is generally determined by means of a simple experimentation with small plots utilizing the plant in question. In addition, plant seeds may be treated with these same higher concentrations of the present compound. Such treatment may be effected by contacting the seeds with a dry mix or a slurry of 5-hydroxy-4-pyrone-2-methylisothiouronium halide, either alone or in combination with gibberellin in a suitable extending agent or with solutions thereof in mixtures such as methyl cellulose and acetone followed by evaporation of the solvent. The coated seeds may then be planted in soil and wetted with water to enable the active agents to penetrate the seed covering.

A particular type of plant may respond considerably more rapidly and more fully to treatment with the active agents of this invention than other plants. However, a variety of types of plants will be stimulated to a greater or lesser extent by the presence of small concentrations of the present active agents. Particularly affected are for example, green leafy, flowering plants of the horticultural and agricultural varieties of both monocotyledons and dicotyledons particularly including leguminous plants. A suitable plant species used in testing the above mentioned active agents, i.e. 5-hydroxy-4-pyrone-2-methylisothiouronium halides and mixtures of these compounds with gibberellin, is duckweed (*lemna minor*), a monocotyledon. The duckweed growth test is widely employed in the evaluation of herbicides and growth stimulants and is described in the literature, for example, in the Journal of Agricultural and Food Chemistry, vol. 2, pp. 178–182, February 17, 1954. The usual procedure employed in the duckweed test is to add the subject compound or mixtures to a synthetic nutrient solution filtered with a sintered glass funnel to sterilize and observe the growth of the duckweed at various levels of the subject compound or mixture. Such plant nutrient media usually contain the major cations, potassium, magnesium, calcium and the major anions, sulfate, nitrate and phosphate such as described in standard texts dealing with nutrition studies, for example, Plant Science Formulae, McLean and Cook (Macmillan), 1950, second edition. Of the various levels of the 5-hydroxy-4-pyrone-2-methylisothiouronium halide of this invention, best results were obtained by employing from about one part per million to about 50 parts per million at which levels increased duckweed growth, i.e. increased leaf number, leaf size, pigmentation, root length as well as wet and dry weight, is noted. With gibberellin alone as the subject compound, the duckweed does not grow well in comparison with plants treated with a 5-hydroxy-4-pyrone-2-methylisothiouronium halide. Further, gibberellins alone are found to inhibit root growth and a marked chlorosis of the leaves is observed. The combination of gibberellins and a 5-hydroxy-4-pyrone-2-methylisothiouronium halide imparts overall increased growth. Increased leaf size, root growth, as well as pigmentation also results. With the present combination a greater leaf size is obtained than with corresponding amounts of a 5-hydroxy-4-pyrone-2-methylisothiouronium halide alone.

A second effective, widely used test involves the growth of Laxton's dwarf progress pea, a dicotyledon, which respond to gibberellin and is used in one of the standard assay methods for this type of growth substance. Specimens of this plant tested with a 5-hydroxy-4-pyrone-2-methylisothiouronium halide showed no increase in height but remarkably increased foliage both in number and size and increased root growth. Other specimens of this plant treated with gibberellins showed remarkable increase in stem length as expected but only normal foliage with chlorosis and retarded root growth. Combinations of gibberellins and a 5-hydroxy-4-pyrone-2-methylisothiouronium halide showed increased height and increased size of leaves which were greener than specimens treated with gibberellins alone. A combination of gibberellin and a 5-hydroxy-4-pyrone-2-methylisothiouronium halide does not appear to be only additive in the effect on the height or elongation of the plant but rather is synergistic since it apparently lessens the requirement of gibberellin necessary to get increased elongation as well as other desirable effects on the foliage and roots. The synergistic action is apparent in the increased growth of plants treated with such a combination in contrast with plants treated with the same concentration of gibberellin alone. The leaf size of plants treated with the above combination is larger than that of plants treated with a 5-hydroxy-4-pyrone-2-methylisothiouronium halide alone.

Other plant species give comparable response to a 5-hydroxy-4-pyrone-2-methylisothiouronium halide and its combination with gibberellin. A simple test procedure may consist of growing a selected plant species in aqueous nutrient media containing varied levels of the active agents of this invention for example, from about 1 to about 50 p.p.m. Those skilled in the art will readily recognize the optimum concentrations for any given species by examination of the growth obtained at these varied levels. The amount of the 5-hydroxy-4-pyrone-2-methylisothiouronium halide, either alone or in combination with gibberellin, which may be employed in promoting the growth of various plant species, will, of course, vary considerably with the type of plant. The time of the year, weather conditions and the state of development of the plant are among the many factors to be considered. In general, however, appreciable growth promotion of plants may be achieved by applying the compounds of this invention either alone or in combination with gibberellins to the plant at a concentration of at least 0.0001% by weight. As stated above, the compound or its combination with gibberellins may be used directly, i.e. undiluted with extending agent.

The compounds of the present invention, i.e. 5-hydroxy-4-pyrone-2-methylisothiouronium halide, may be prepared by methods described in the literature such as the reaction of a halokojic acid, for example, chloro, bromo, or iodokojic acid, with thiourea as described in the Journal of American Chemical Society, 70, page 4264, 1948. Where reference is made in this disclosure and in the claims appended thereto to gibberellin there is meant a plant growth-promoting gibberellin-type compound such as gibberellic acid $C_{19}H_{22}O_6$, gibberellin A $C_{19}H_{24}O_6$ and gibberellin $A_2$ $C_{19}H_{26}O_6$, all of which are described in numerous articles in the literature. Stodola, in the Arch. Biochem. and Biophys.; 54, 240-5 (1955), has described a procedure for producing gibberellin by fermenting a nutrient medium with *Gibberella fujikuroi*. The gibberellin-type compounds may be used alone or in combination to produce the above described valuable and desirable results. In the following examples, gibberellin X and a mixture of gibberellin A and gibberellin X produced by the above mentioned fermentation were employed as the gibberellin compound. The proportions of reagents in the examples are by weight, unless otherwise specified.

The following examples are given by way of illustration and are not to be construed as limitations of this invention, many variations of which are possible within the scope and spirit thereof.

*Example I*

Laxton's dwarf progress pea specimens were grown in standard aqueous nutrient medium to which was added various levels of gibberellin, 5-hydroxy-4-pyrone-2-methylisothiouronium chloride, or mixtures of these compounds. Two groups of five specimens were grown in untreated nutrient and served as a control. Five plants were used in each test group. The results are tabulated in Table I.

TABLE I

| Agent | Concentration (p.p.m.) | Total growth of plants in inches (after 7 days application) |
|---|---|---|
| gibberellin | ½ | 18½–20½ (leaves same size as control with chlorosis. Roots same as control). |
| 5-hydroxy-4-pyrone-2-methylisothiouronium chloride. | 10 | 10½–11½ (leaves increased in size and color; root growth also increased). |
| 5-hydroxy-4-pyrone-2-methylisothiouronium chloride. | 20 | |
| gibberellin and | ½ | 23 (leaves larger and greener in addition to increased height. Root growth also increased). |
| 5-hydroxy-4-pyrone-2-methylisothiouronium chloride. | 10 | |
| gibberellin and | ½ | 23½ (leaves more than twice the size of control leaves). |
| 5-hydroxy-4-pyrone-2-methylisothiouronium chloride. | 20 | |
| control | 0 | 10½. 11½. |

*Example II*

Duckweed specimens were grown in standard nutrient solutions with graded levels of 5-hydroxy-4-pyrone-2-methylisothiouronium chloride. The results are recorded in Table II.

TABLE II

| Concentration (p.p.m.) | Percent change from control on wet weight basis of plant |
|---|---|
| 1 | 35 |
| 5 | 335 |
| 10 | 385 |
| 20 | 480 |
| 50 | 100 |

The roots and foliage of these specimens were considerably larger than controls.

*Example III*

The procedures of Examples I and II were repeated employing 5 - hydroxy - 4 - pyrone - 2 - methylisothiouronium bromide and iodide with comparable results.

*Example IV*

To a mixture of 100 g. of pulverized calcium carbonate, 2 grams of olein and one gram of slaked lime was added sufficient 5 - hydroxy - 4 - pyrone - 2 - methylisothiouronium chloride to give a mixture containing 100 parts per million of 5-hydroxy-4-pyrone-2-methylisothiouronium chloride and the mixture was ground in a ball mill. The resulting powder is easily scattered, has good adhesive power and promotes growth when applied to plants.

*Example V*

A mixture of 5 mg. of 5-hydroxy-4-pyrone-2-methylisothiouronium chloride, 25 g. of talcum, 4 g. of sodium dibutyl naphthalene sulfonate, 4 g. of casein and 5 g. of sodium carbonate was ground in a ball mill. The mixture was added to an equal quantity of ground calcium carbonate and thoroughly mixed. This powder may be suspended in water immediately before use and gives a growth-promoting suspension which is sufficiently stable for use in spraying applications.

*Example VI*

A mixture is prepared containing 10 mg. of 5-hydroxy-4-pyrone-2-methylisothiouronium chloride, 20 g. of xylene and 80 g. of Turkey-red oil. This solution can be readily emulsified in water and the emulsion is suitable as a spray.

*Example VII*

5-hydroxy-4-pyrone-2-methylisothiouronium bromide was dispersed in petroleum jelly to give a mixture which contained 0.04% by weight of the active agent. The mixture was found effective in promoting plant growth.

*Example VIII*

A mixture was prepared containing 0.001% of 5-hydroxy-4-pyrone-2-methylisothiouronium chloride in water to which was added 0.1% by volume of Tween 80, a mixture of polyoxyethylene ethers of mixed partial oleic esters of Sorbitol anhydrides (Atlas Powder Corp.). The mixture is useful as a foliar spray.

*Example IX*

The mixture of Example VIII was duplicated with the addition of 0.00005% of gibberellin. The mixture is useful in spray applications of the active ingredients.

*Example X*

A mixture was prepared consisting of 0.005% of 5-hydroxy-4-pyrone-2-methylisothiouronium iodide and 0.00025% of gibberellin in water to which was added 0.1% by volume of Tween 80 (Atlas Powder Corp.). The mixture is useful in spray applications of the active ingredients.

*Example XI*

5-hydroxy-4-pyrone-2-methylisothiouronium chloride was dissolved in acetone to give 0.02% solution of the active ingredient. The solution is useful in treating seeds with the active ingredient by immersion of the seeds, followed by evaporation of the solvent.

*Example XII*

A mixure of talcum and 0.04% by weight of 5-hydroxy-4-pyrone-2-methylisothiouronium chloride was prepared. The mixture is useful in treating plant seeds with the active ingredient.

*Example XIII*

A mixture in the ratio of 20 parts by weight of 5-hydroxy-4-pyrone-2-methylisothiouronium chloride to one part of gibberellin was added to acetone to give a 0.02% solution of pyrone compound. The mixture is useful in treating plant seeds with the active ingredients.

*Example XIV*

The prodire of Example I was repeated with gibberellic acid (gibberellin X) in place of gibberellin with comparable results.

*Example XV*

A solution containing 15 mg. of 5-hydroxy-4-pyrone-2-methylisothiouronium chloride, 4 g. of acetone and 100 g. of Freon-12 is prepared and used as a growth promoter in an aerosol form.

*Example XVI*

A solution containing 15 mg. of 5-hydroxy-4-pyrone-2-methylisothiouronium chloride, 0.75 mg. of gibberellin, 4 g. of acetone and 100 g. of Freon-12 is prepared and used as a growth promotor in an aerosol form.

What is claimed is:

1. A growth promoting agricultural composition which comprises a 5-hydroxy-4-pyrone-2-methylisothiouronium halide and gibberellic acid in an agriculturally-acceptable extending medium, the halide being a member selected from the group consisting of chloride, bromide and iodide, the ratio by weight of the halide to gibberellic acid being from about 20 to about 40 parts to one.

2. A composition as claimed in claim 1 in which the agricultural extending medium is a solid.

3. A composition as claimed in claim 1 in which the agricultural extending medium is a liquid.

4. A composition as claimed in claim 1 in which the halide is iodide.

5. A composition as claimed in claim 1 in which the halide is bromide.

6. A composition as claimed in claim 1 in which the halide is chloride.

7. A process for promoting plant growth which comprises contacting a plant with an effective amount of 5-hydroxy-4-pyrone-2-methylisothiouronium halide, the halide being a member selected from the group consisting of chloride, bromide and iodide.

8. A process for promoting plant growth which comprises contacting a plant with an effective amount of a composition comprising a 5-hydroxy-4-pyrone-2-methylisothiouronium halide and gibberellic acid in an agriculturally-acceptable extending medium, the halide being a member selected from the group consisting of chloride, bromide and iodide, the ratio by weight of the halide to gibberellic acid being from about 20 to about 40 parts to one.

References Cited in the file of this patent

UNITED STATES PATENTS

| | | |
|---|---|---|
| 2,547,366 | Bock et al. | Apr. 3, 1951 |
| 2,708,679 | Lo et al. | May 17, 1955 |
| 2,842,051 | Brian et al. | July 8, 1958 |

OTHER REFERENCES

J.A.C.S. 70, pages 4264–65, December 1948.
Whaley et al.: "Science," vol. 125, 1956, page 234.
Schroeder et al.: "Science," October 11, 1957, page 701.
Research in "Chem. and Eng. News," September 17, 1956, pages 4496–4501.
Radley: "Nature," vol. 178, No. 4541, November 10, 1956, pages 1070–1.